(12) United States Patent
Alfandary et al.

(10) Patent No.: US 8,725,598 B2
(45) Date of Patent: May 13, 2014

(54) STOCK FLOW MANAGEMENT SYSTEM AND METHOD

(75) Inventors: Shai Alfandary, Zur Moshe (IL); Zahi Libfeld, Even-Yehuda (IL); Ziv Holzman, Tel-Aviv (IL); Michal Diga, Petah-Tikva (IL); Orit Harel, Kadima (IL); Malkiel Hadari, Hod Hasharon (IL)

(73) Assignee: SAP AG, Walldorf (DE)

( * ) Notice: Subject to any disclaimer, the term of this patent is extended or adjusted under 35 U.S.C. 154(b) by 747 days.

(21) Appl. No.: 12/136,514

(22) Filed: Jun. 10, 2008

(65) Prior Publication Data

US 2008/0294527 A1 Nov. 27, 2008

Related U.S. Application Data

(62) Division of application No. 11/322,486, filed on Dec. 30, 2005.

(51) Int. Cl.
*G06G 1/14* (2006.01)
*G06Q 20/00* (2012.01)

(52) U.S. Cl.
USPC .............................................. 705/28; 705/22

(58) Field of Classification Search
USPC .............................................. 705/10, 22, 28
See application file for complete search history.

(56) References Cited

U.S. PATENT DOCUMENTS

| | | | | |
|---|---|---|---|---|
| 4,783,740 | A | | 11/1988 | Ishizawa et al. |
| 4,947,322 | A | * | 8/1990 | Tenma et al. ............... 705/7.22 |
| 5,128,861 | A | * | 7/1992 | Kagami et al. ............... 705/7.31 |
| 5,128,961 | A | | 7/1992 | Ueda et al. |
| 5,237,496 | A | * | 8/1993 | Kagami et al. ............... 705/7.31 |
| 5,265,006 | A | * | 11/1993 | Asthana et al. ............... 705/7.26 |
| 5,537,313 | A | * | 7/1996 | Pirelli ............................... 705/28 |
| 5,608,643 | A | * | 3/1997 | Wichter et al. ............... 700/244 |
| 5,712,989 | A | * | 1/1998 | Johnson et al. ............... 705/28 |
| 5,819,232 | A | | 10/1998 | Shipman |
| 5,936,860 | A | | 8/1999 | Arnold et al. |
| 5,987,423 | A | | 11/1999 | Arnold et al. |
| 6,006,196 | A | | 12/1999 | Feigin et al. |
| 6,026,378 | A | | 2/2000 | Onozaki |
| 6,341,269 | B1 | | 1/2002 | Dulaney et al. |

(Continued)

OTHER PUBLICATIONS

USPTO Non Final Office Action in U.S. Appl. No. 11/322,478, mailed Feb. 8, 2008, 16 pages.

(Continued)

*Primary Examiner* — Matthew Gart
*Assistant Examiner* — Talia Crawley
(74) *Attorney, Agent, or Firm* — Fish & Richardson P.C.

(57) ABSTRACT

A computer program product tangibly embodied in an information carrier includes instructions that, when executed, perform operations that modify stock levels of a storage location in a logistic environment system. The operations include receiving information indicating a stock level change at storage location database objects that each represent a storage location for stock in a logistic environment. A storage location database object has associated with it a rule, a stock amount value specifying an amount of stock for the storage location, and a threshold that indicates a stock level to be maintained for the storage location. The operations also include determining, using the rule, if the stock level change would cause the stock amount value to cross the threshold, and if so, generating a request to modify the amount of stock at the storage location so that the stock amount value does not cross the threshold.

20 Claims, 10 Drawing Sheets

(56) References Cited

U.S. PATENT DOCUMENTS

| | | | |
|---|---|---|---|
| 6,549,891 B1 | 4/2003 | Rauber et al. | |
| 6,681,990 B2* | 1/2004 | Vogler et al. | 235/385 |
| 6,744,436 B1 | 6/2004 | Chirieleison, Jr. et al. | |
| 6,799,671 B1 | 10/2004 | Gomez | |
| 6,961,709 B2 | 11/2005 | Goodwin, III | |
| 6,970,768 B2 | 11/2005 | Chien | |
| 6,974,928 B2 | 12/2005 | Bloom | |
| 7,031,782 B2 | 4/2006 | Kappelhoff et al. | |
| 7,054,704 B2* | 5/2006 | Bickley et al. | 700/100 |
| 7,107,113 B1 | 9/2006 | Morenz et al. | |
| 7,155,402 B1* | 12/2006 | Dvorak | 705/14.41 |
| 7,711,449 B2* | 5/2010 | Abdulhay et al. | 700/236 |
| 2002/0103709 A1* | 8/2002 | Anthony et al. | 705/22 |
| 2002/0138358 A1 | 9/2002 | Scheer | 705/26 |
| 2002/0174001 A1* | 11/2002 | Henry | 705/7 |
| 2003/0009398 A1* | 1/2003 | Lin et al. | 705/28 |
| 2003/0033180 A1* | 2/2003 | Shekar et al. | 705/7 |
| 2003/0204480 A1 | 10/2003 | Heinrichs et al. | |
| 2003/0208417 A1* | 11/2003 | Heinrichs et al. | 705/28 |
| 2003/0216969 A1* | 11/2003 | Bauer et al. | 705/22 |
| 2004/0034581 A1* | 2/2004 | Hill et al. | 705/28 |
| 2004/0181467 A1* | 9/2004 | Raiyani et al. | 705/28 |
| 2004/0186794 A1* | 9/2004 | Renz et al. | 705/28 |
| 2004/0236645 A1 | 11/2004 | Tien | |
| 2005/0044026 A1* | 2/2005 | Leistner | 705/35 |
| 2005/0049943 A1* | 3/2005 | Luo et al. | 705/28 |
| 2005/0150951 A1* | 7/2005 | Sacco et al. | 235/385 |
| 2006/0085296 A1* | 4/2006 | Strickland | 705/28 |
| 2007/0011053 A1 | 1/2007 | Yap | |
| 2008/0103851 A1* | 5/2008 | Walker et al. | 705/7 |

OTHER PUBLICATIONS

USPTO Final Office Action in U.S. Appl. No. 11/322,478, mailed Oct. 29, 2008, 19 pages.

USPTO Non Final Office Action in U.S. Appl. No. 11/322,478, mailed Jun. 8, 2009, 20 pages.

* cited by examiner

STOCK FLOW MANAGEMENT SYSTEM AND METHOD

CROSS-REFERENCE TO RELATED APPLICATIONS

This application is a divisional of U.S. patent application Ser. No. 11/322,486, filed Dec. 30, 2005, and entitled "Stock Flow Management System and Method." The contents of which are incorporated herein by reference in its entirety.

TECHNICAL FIELD

This application relates to a stock flow management system and method.

BACKGROUND

As logistic environments, such as warehouse or production facilities, become larger, management of these environments has become increasingly complex. Current systems can model the logistic environments with software to enable human managers to control execution and planning of the environments. For example, some software models may provide warehouse workers with instructions regarding where to move incoming stock based on the model's knowledge of what locations can store the stock.

Managing the stock levels at storage locations is a function incorporated into some current software systems. The software systems may use global processes that are aware of all of the storage locations within the logistic environment and manage the stock for each of the locations. A global process can be very complex and difficult to understand and maintain because of the variety and number of storage locations it must manage.

Additionally, a separate global process may be necessary for each type of process performed for the location. For example, current systems may have one global process for replenishment, which is an operation which adds stock to location, and a separate global process for counting inventory at the location.

SUMMARY

The present application relates to a stock flow management system and method for removing stock from a location and replenishing a location.

In a first general aspect, a computer program product tangibly embodied in an information carrier is described. The computer program product includes instructions that, when executed, perform operations that modify stock levels of a storage location in a logistic environment system. The operations include receiving information indicating a stock level change at storage location database objects that each represent a storage location for stock in a logistic environment. A storage location database object has associated with it a rule, a stock amount value specifying an amount of stock for the storage location, and a threshold that indicates a stock level to be maintained for the storage location. The operations also include determining, using the rule, if the stock level change would cause the stock amount value to cross the threshold, and if so, generating a request to modify the amount of stock at the storage location so that the stock amount value does not cross the threshold.

In a second general aspect, a logistic environment system for maintaining stock levels by an object representing a storage location is described. The system includes a storage location database object that represents a storage location for stock in a logistic environment. The storage location database object is adapted to receive information indicating a stock level change. The system also includes a stock amount value associated with the storage location database object. The stock amount value specifies an amount of stock for the storage location. Additionally, the system includes a threshold associated with the storage location database object, wherein the threshold indicates a stock level to be maintained for the storage location, and a set of rules associated with the storage location database object that determine if the stock level change would cause the stock amount value to cross the threshold and that initiate a request to remove or add stock to the storage location so that the stock amount value does not cross the threshold.

In a third general aspect, a computer program product tangibly embodied in an information carrier is described, where the computer program product includes instructions that, when executed, perform operations that manage a removal of stock from a storage location in a logistic environment. The operations include receiving a trigger event at an electronic storage control object that represents storage attributes for a location that stores stock in a logistic environment. The electronic storage control object accesses a threshold for an attribute value of the stock for the location. The operations also include comparing, in response to the received trigger event, a current attribute value of the stock with the threshold, and transmitting a request to remove at least a portion of the stock from the location if the current attribute value crosses the threshold.

In a fourth general aspect, a logistic environment system for initiating stock removal from a location is described. The system includes an electronic storage control object that represents storage attributes for a storage location for stock in a logistic environment. The electronic storage control object is adapted to receive a trigger event. The system also includes a threshold for an attribute value of the stock at the location, wherein the threshold is accessible by the electronic storage control object, and a set of rules that compare a current attribute value of the stock with the threshold in response to the received trigger event and that transmit a request to remove at least a portion of the stock from the location if the current attribute value crosses the threshold.

Advantages of the systems and techniques described herein may include any or all of the following: simplifying maintenance of stock levels at storage locations; facilitating stock management at multiple levels of locations in a hierarchy; facilitating cleanup of locations; improving the flexibility of replenishment methods; permitting independence from global managers that are aware of all locations; providing encapsulation of the location's storage behaviors; minimizing the number of managers required to manage rules applied to a location; reducing the number of rules required for management; and supporting replenishment and cleanup operations on both warehouse and production processes.

The details of one or more embodiments are set forth in the accompanying drawings and the description below. Other features, objects, and advantages of the embodiments will be apparent from the description and drawings, and from the claims.

DESCRIPTION OF DRAWINGS

Like reference symbols in the various drawings indicate like elements.

DETAILED DESCRIPTION

Figure 1:
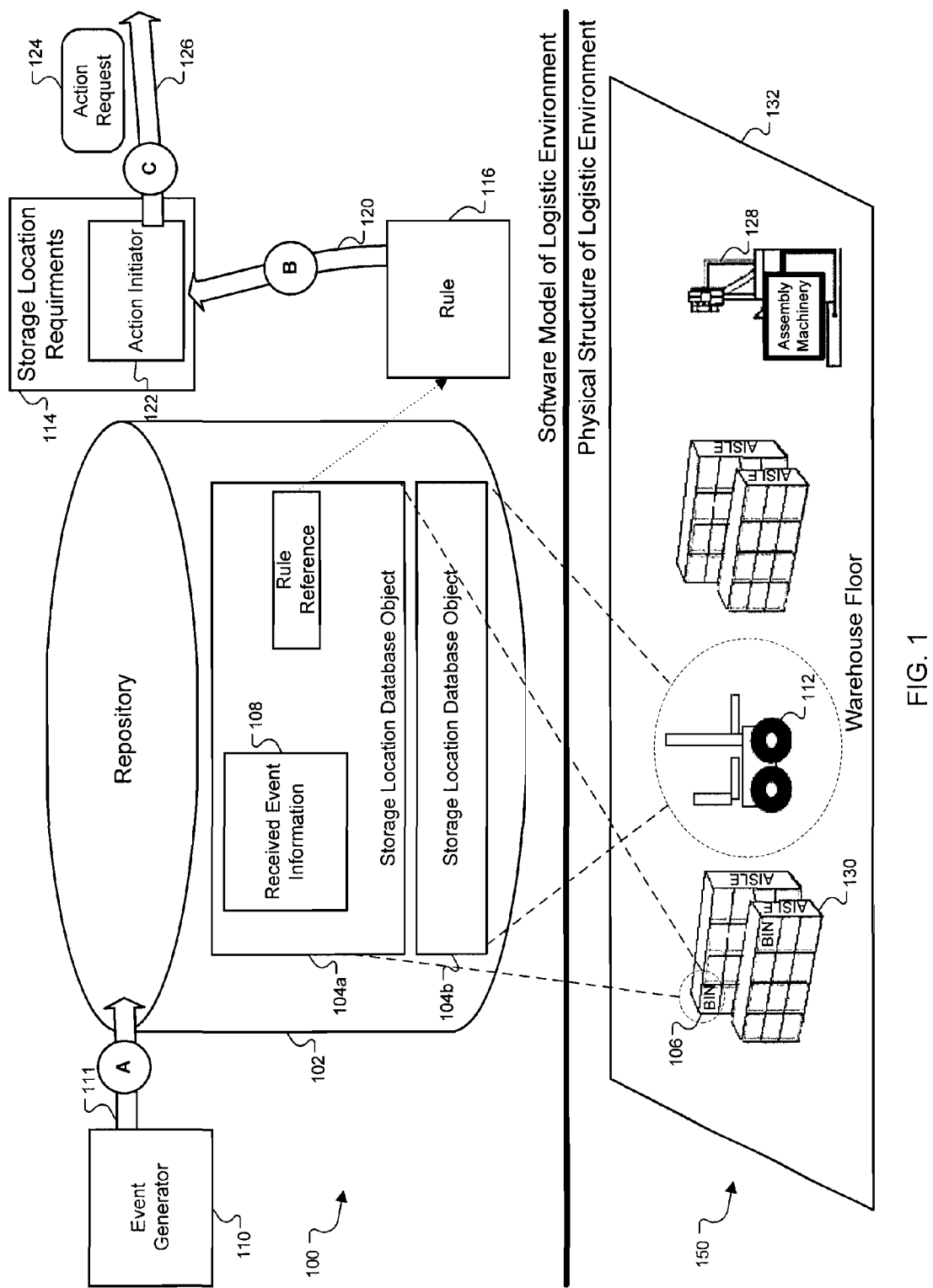
FIG. 1 is a schematic diagram of a system for taking actions on stock in a logistic environment according to one implementation.

A system 100 shown in FIG. 1 is an exemplary software model of a logistic environment 150, such as a warehouse. The system 100 can contain an "aware location," such as the storage location database object, that accesses information to determine, for example, whether it needs more stock or has too much stock. In one embodiment, the storage location database object includes rules that dictate how an associated location behaves. This determination may be made independent of a global process that monitors the stock needs of multiple locations. The aware location can manage its own stock instead of relying on an outside process to manage the stock for it.

The system 100 receives event information, such as a timer event, and compares how much stock the location has or how much stock it is expected to have in the future with a set of requirements. The set of requirements, such as stock level thresholds, can specify optimal and critical levels that indicate amounts of stock that trigger requests to remove or add more stock. For example, the storage location requirements may include an amount of stock that defines a minimum clean-up level. When the stock drops below this level, the storage location should be cleaned out. The storage location database object, which implement the aware location concept, can then initiates the requests for these actions if the comparison indicates that the location needs more or less stock.

More specifically, FIG. 1 includes a repository 102 of storage location database objects (SLDOs) 104, each of which represent a storage location in the logistic environment 150. In this example, the logistic environment 150 is a warehouse. A SLDO 104a represents a bin 106 in the warehouse 150 and can receive event information 108 from an event generator 110, as indicated by an arrow 111. In one implementation, the event generator 110 is not limited to standard software concepts in event/listener architecture, but can also include an object which transmits batch processes on a regular interval. For example, the object can gather multiple requests into request batches and submit them every hour. The requests can result from the creation of objects, and the event generator can compile information related to all the object creations for the last hour and submit this as an "event."

The repository 102 can include other SLDOs, such as a SLDO 104b, that represent other storage locations in the warehouse 150, such as resources like the forklift 112. In other words, the SLDO may represent both physical logistic areas in an environment, such as aisles and bins, and resources, such as trucks, workers, and production machinery.

The system 100 can also include storage location requirements 114, such as thresholds, and a rule 116 associated with the SLDO 104a. The storage location requirements 114 can describe requirements that are to be maintained for the storage location associated with the SLDO 104a. For example, the storage location requirements may include an amount of stock that defines a minimum clean-up level. When the stock drops below this level, the storage location should be cleaned out. The rule 116 can use the received event information 108 and the storage location requirements 114, as indicated by arrows 118 and 120, respectively, to determine whether the event information 108 impacts upon a condition created by the storage location requirements 114 such that the condition will not be maintained. For example, the requirement may be a threshold of 50 units. This can be used to create a condition that specifies that the current amount of stock at the location must remain above 50 units or new stock must be requested for the location (if current <50 units, then request stock).

If the rule 116 determines that the condition created by the storage location requirements will not be met, an action initiator 122 can transmit an action request 124, as indicated by an arrow 126, which specifies an action to be taken on the storage location associated with the SLDO 104a. This action can facilitate maintaining the condition. For example, the action request may be a request for a worker to move more stock to the storage location. This can occur, for example, if the event information includes a request to retrieve more stock from the storage location than the storage location currently holds. The action request 124 may request the worker to deliver more stock to the location so that the expected request to retrieve more stock can be satisfied.

The arrows 111, 120, and 126 are labeled alphabetically indicating a sequence order for the operations according to one implementation. In FIG. 1, the event generator 110 transmits the event information 108 to the SLDO 104 (arrow labeled A). Retrieval of the rule using the rule reference is triggered by the received event information, and the rule 116 uses the storage location requirements 114 in evaluating the condition (arrow labeled B). If the condition created by the requirements will not be maintained, the action initiator 122 transmits the action request 124 (arrow labeled C).

The SLDOs 104 can represent many types and levels of storage locations. As shown in FIG. 1, the different types of storage locations may include resources, such as the forklift 112, production machinery, such as an assembly machine 128, and physical areas, such as the bin 106. In some implementations, the resources also include packing machinery that packages the stock using containers. The storage locations may be organized into hierarchical levels. For example, the physical area of an aisle 130 may include several bins 106 that are considered to be at lower levels, or resolutions, of the hierarchy. Furthermore, the entire warehouse floor 132 can be considered a storage location at a higher level than the aisle 130.

The higher-level storage locations may be used to identify the lower level storage locations that they logically contain. For instance, the system may specify all or any of the bins 106 by specifying an aisle 130 that includes the bins. In one example, all of the bins in an aisle may be associated with a particular rule by selecting the aisle, which in turn, is used to select all of the bins. In another example, stock may be placed in a bin contained in an aisle, by specifying the aisle as the location to store the stock. The system may then select a bin within the aisle for storing the stock. The bin does not have to be pre-specified for storing the stock before the system selects it based on the aisle. In some implementations, each of the lower level SLDOs include references to their parent levels, but the parent levels do not have references to their children. In this case, in order to identify bins in Aisle A, the bins must be queried to determine which bins belong to Aisle A.

Figure 2:
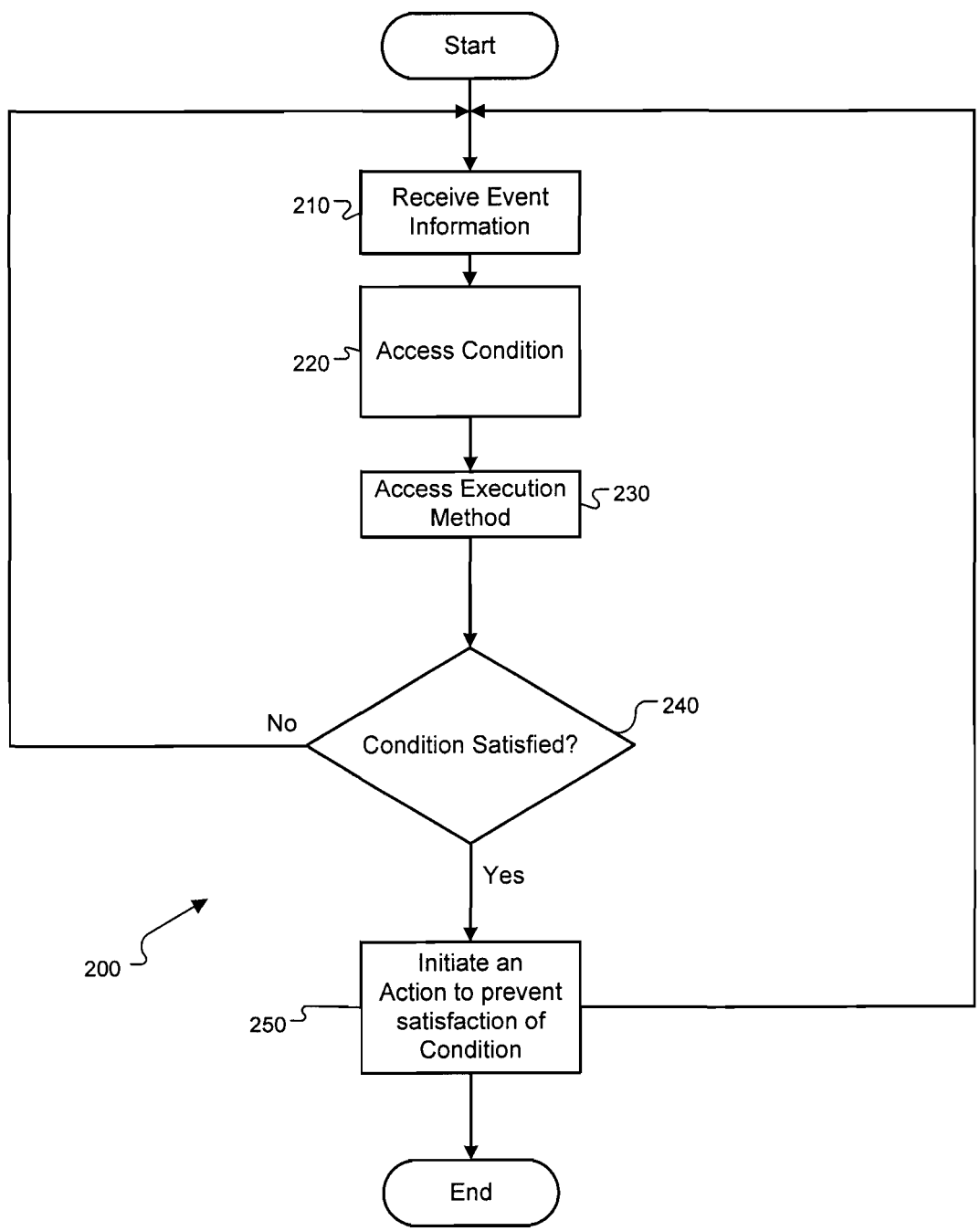
FIG. 2 is an exemplary method, which may be implemented by the system, for maintaining a stock level in a storage location.

FIG. 2 is an exemplary method 200, which may be implemented by the system 100, for maintaining a stock level in a storage location. For example, a computer program product may include instructions that cause a processor to perform operations comprising the steps of the method 200. As shown in FIG. 2, the method 200 includes the following steps:

In step 210, event information is received. For example, the event information 108 may include an allocation request, which reserves stock at the location for future use. The allocation request can trigger an evaluation by the SLDO to determine if the SLDO's condition is affected by the request. The SLDO can use rules to determine whether the condition is impacted based on data included in the event information 108.

The information 108 can include a material related to the allocation request. The material can specify the type of stock, such as a Motorola V66 cell phone, and can be used to select a rule to evaluate the state of the location to determine if an action should be requested. The information 108 can also include a level indicator, which may specify a level a location hierarchy (e.g., warehouse, aisle, bin) to search, and a logistic unit identifier, such as a PALLET_LU. Both or either of these pieces of information may be used to select a rule from among of a set of rules. For example, there can be three rules: one for handling perfume, one for handling pallets, and one for perfume packed on pallets. The event information may specify that the material is "perfume" and the LU is "pallet." The system can use this information to select the rule for perfume and pallets because all of the information given most closely matches this rule.

In steps 220 and 230, conditions associated with the event information and an execution method are also accessed, respectively. For example, the conditions that are impacted by the event information 108, as determined in step 210, are accessed by the rule 116. The execution method may be part of the rule 116, and it can define an action to take, such as generating a request for more stock, if the condition is satisfied.

A determination can be made in step 240 whether the condition created by the requirements for the location is satisfied. In one implementation, the rule 116 may make the determination based on the amount of current stock associated with the location, the expected amount of stock, and the requirement for the storage location requirements 114. The expected amount of stock can include information from previous event information 108 transmitted by the event generator. For example, the event information may have previously transmitted information 108 indicating that 10 units of stock are scheduled for retrieval from the storage location. The rule 116 subtracts the 10 units from the current amount of stock associated with the storage location and compares it to the storage location threshold 114, which indicates a minimum amount of stock that is necessary in the storage location. If the resulting amount of stock after the 10 units are removed from the current amount of stock does not fall below the minimum amount of stock necessary for the location, the method 200 may return to step 210. If the resulting amount does fall below the requirement, step 250 may be performed.

In another implementation the rule 116 may make the determination based on another current attribute of the stock at the location besides the amount, such as an expiration date associated with the stock. For example, the incoming event may trigger the rule to compare an expiration date property associated with the stock to a requirement, such as the current date. If the expiration date is greater than or equal to the current date, step 250 can be performed. Otherwise, the method may return to step 210.

If the event information does impact the condition, an action may be initiated to maintain the requirements, as indicated by step 250. For example, if the resulting amount described in step 240 falls below the requirement, an action, such as a request for more stock at the location, can be initiated. In some implementations, the request is initiated by an object that manages the storage location requirements 114. In other implementations, the requests can be initiated by the SLDO 104a.

Figure 3:
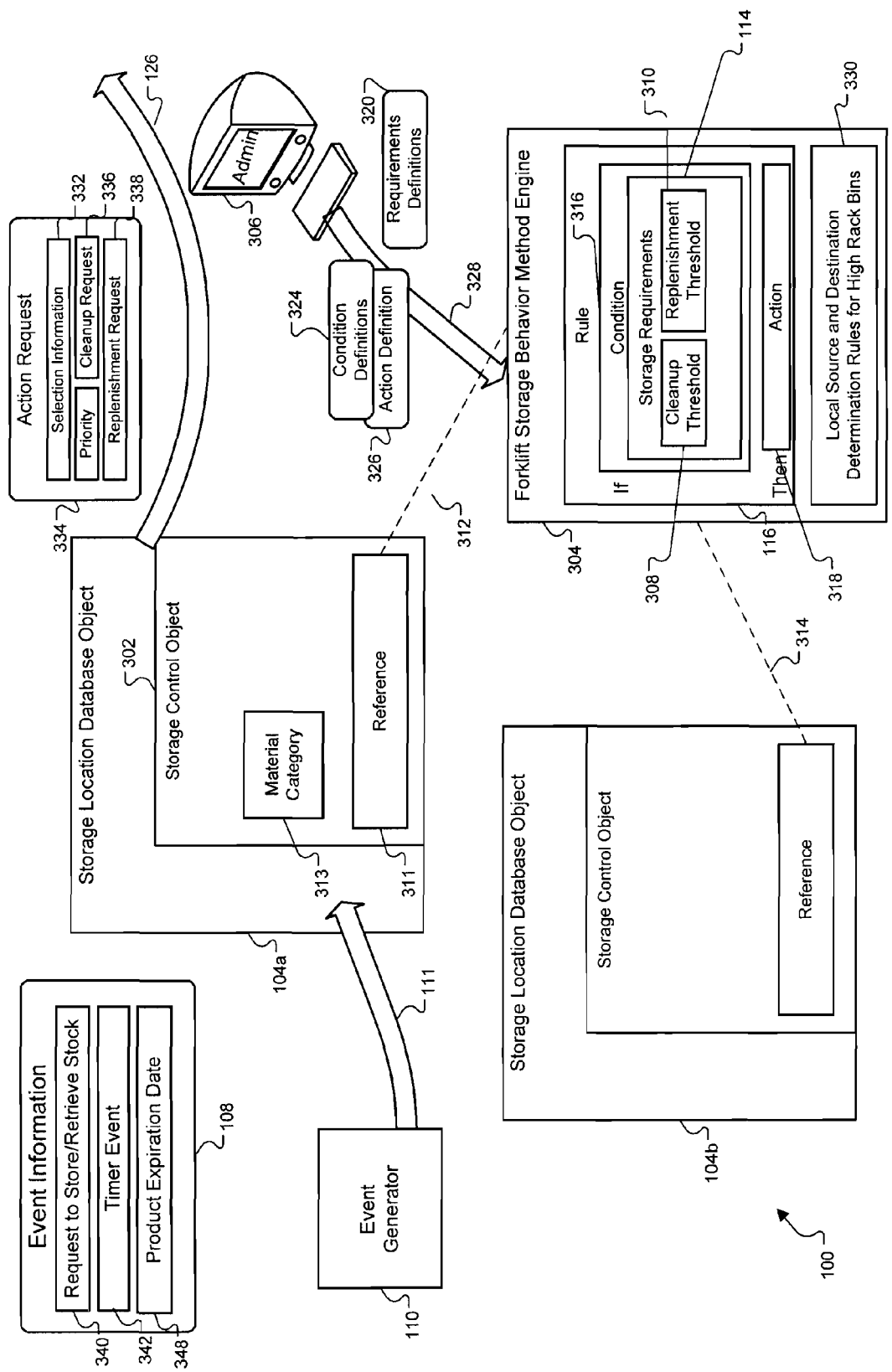
FIG. 3 is a more detailed schematic diagram of the system shown in FIG. 1 according to one implementation.

FIG. 3 is a more detailed schematic diagram of the system 100 shown in FIG. 1 according to one implementation. The system 100 includes the event generator 110, the SLDO 104a, a storage control object 302 that includes the storage location requirements 114, a storage behavior method module 304 that holds the rule 116, and an administrative computing device 306 used to modify the rule 116 and the storage location requirements 114. The event generator 110 can transmit the event information 108 to the SLDO 104a, which delegates the responsibility for acting upon the information to the storage control object 302. The storage control object 302 can access and use the rule 116 in the storage behavior method (SBM) module 304 to determine whether the condition created by the requirements for the storage location is impacted by the received event information 108. If the condition is impacted, the storage control object 302 may initiate an action request 124 designed to maintain the requirements for the storage location.

In some implementations, the storage control object is dependent upon the SLDO 104a and accesses storage location requirements 114 for that SLDO, such as clean-up and replenishment thresholds, 308 and 310, respectively. For example, each storage control object can include a reference 311 to the SBM 302.

The clean-up thresholds can indicate when the storage location has too much stock. When a clean-up threshold is exceeded, the storage control object 302 can generate a request to remove the excess stock from the storage location. In another example, if the stock amount at the location falls below a clean-up threshold, it may signify that there is not enough stock in the storage location to justify keeping stock that location. In that situation, the storage control object 302 can generate a request to remove the remaining stock.

The replenishment thresholds can indicate when the storage location needs more stock. When a stock amount falls below a replenishment threshold, the storage control object 302 can generate a request to replenish the stock at that location.

Again, the storage control object 302 can also include a pointer, such as the reference 311, to the SBM module. The SBM can contain a set of rules that are applicable to locations that share common characteristics. For example, a group of SLDOs, such as the SLDOs 104a and 104b, may represent resources, such as forklifts used in a warehouse. The forklift SLDOs 104 can access common methods that evaluate and take an action based on restrictions, such as weight restrictions (e.g., forklifts can only carry 300 lbs) and resource restrictions (e.g., the forklifts are only assigned to carry dairy products). The link between multiple SLDOs or the SLDOs' dependent storage object 302 and a single SBM is shown by the dashed lines 312 and 314. This link can be accomplished using the reference 311 that identifies the SBM.

Additionally, the storage control object 302 can include a material category 313, which identifies the type or types of stock that may be stored in the location. For example, if the material category is ball point pens, only ball point pens can be stored at that location.

Each rule can include a condition 316 and a specified action 318 that is requested if the condition is satisfied. For example, the condition 316 can include a formula that sums the current amount of stock and the expected amount stock associated with the location. The condition 316 can also include a threshold that describes a requirement for the storage location, such as a minimum amount of stock required. Using the condition, the system can determine if the summed amount is greater or less than the threshold. If the condition 316 is satisfied, the action 318 can be performed.

In one implementation, such as a replenishment implementation, the condition is satisfied if the summed amount is less than the threshold (summed amount<threshold=true). The action 318 can include a request which causes the condition to remain unsatisfied (summed amount<threshold=false). For example, the condition 316 may be satisfied if the summed amount of the current and expected stock for the location is less than a threshold indicating a minimum requirement of stock to be maintained at the location. If the condition is satisfied, or true, the rule 116 can initiate an action to increase the amount of stock in a location so that the amount is greater than the threshold, and the condition is no longer satisfied In other words, the action can increase, the amount of stock to a quantity that is greater than the minimum quantity specified by the threshold.

The action 318 may be executed by the rule 116 to generate the action request 124. For example, the storage control object 302 may call the rule 116 using the reference 311 and pass information needed to calculate the condition 316 to the method. If the condition 316 is satisfied, the action 318 may create and transmit the action request 124.

In another implantation, the action is initiated if the condition is false. For example, the condition may be false if a current quantity of stock at the location is greater than the threshold (current quantity of stock<threshold=false). In a clean-up scenario, an action may be performed if the condition is false, and the results of the action may satisfy the condition, or make it true. For example, if the current level of stock is greater than the maximum clean-up threshold (e.g., 5 units<4 units=false), a request to remove stock may be initiated. After removal of stock the condition can be satisfied. For example, if two units are removed, the condition is satisfied (e.g., 3 units<4 units=true).

The action request can include several types of information, such as selection information 332, a priority 334 assigned to the requested action, a clean-up request, and a replenishment request. The priority 334 may indicate an urgency to perform the action request 124 relative to other requests. The clean-up request 336 can be a request to remove stock from the location, and the replenishment request 338 can be a request to add stock to the location. The selection information 332 may indicate that the location should be selected over another location for the storage of stock. This is described in greater detail in association with FIG. 5.

The administrative computing device 306 may modify information in the storage control object and SBM. For example, a user of the computing device 306 can input requirement definitions 320 as indicated by an arrow 328. The requirement definitions 320 can include values for the thresholds, such as the stock amount "25" for a replenishment threshold. When the stock amount associated with the location drops below 25 units, an action may be executed as described above.

The administrative computing device 306 may also modify information in the rule 116. For example, the user can input condition definitions 324 and action definitions 326, which are transferred to the SBM as shown by the arrow 328. The condition definitions 324 may define what conditions 316 are necessary to initiate the action 318. For example, the condition may only consider the current amount of stock associate with the location when comparing the stock amount to a threshold, while disregarding any expected stock associated with the location. The action definitions 326 can define the action 318 that is performed when the condition 316 is satisfied. For example, the user may specify that stock is requested from a particular location when a request for replenishment is transmitted.

In addition to the rule 116, the SBM can also include local source and destination determination (SDD) rules 330 that specify how stock should be handled at the associated storage location. For example, the local SDD rules 330 may specify that stock removed from the location should be removed using a first in, first out (FIFO) method. In another example, the rules 330 may specify that stock, such as milk, that is close to its expiration date be retrieved before stock that has an expiration date further in the future.

The event generator can generate event information and transmit the information to the location SLDO 104, which can, in turn, delegate the responsibility of acting on the information to the dependent storage control object. The event information 108 can include many types of information, such as a request to store or retrieve stock 340 at a present or future time, a timer event 342, product expiration dates, and product expiration queries.

The event generator 110 may transmit a timer event after a predefined period of time has past. For example, the timer event 342 may indicate that a month has passed.

The storage control object can access this event 342 and use the rule 116 to determine if, for example, the inventory has been counted within the last month. If it has not been counted in a month, the storage control object 302 may generate an action request 124 for an inventory count to be performed on the location. Similarly, the event generator 110 may transmit an event that triggers the storage control object to determine if any stock stored at the location has expired. The storage control object may compare an expiration date property associated with the stock to a threshold, which may include the current date. If the expiration date of the stock is greater than the current date, the storage control object 302 may generate an action request 124 to clean-up, or remove, the expired stock.

In some implementations, the stock can be removed a defined number of days before it has expired. After receiving an event, the storage control object may compare the expiration date property for the stock at the location with the current date plus a threshold of a predefined time period. For example, the threshold may be three days, so if the stock's expiration date exceeds the current date plus three days (expirationDate<systemDate+threshold), an action may be generated to remove the stock three days before it expires.

Figure 4:
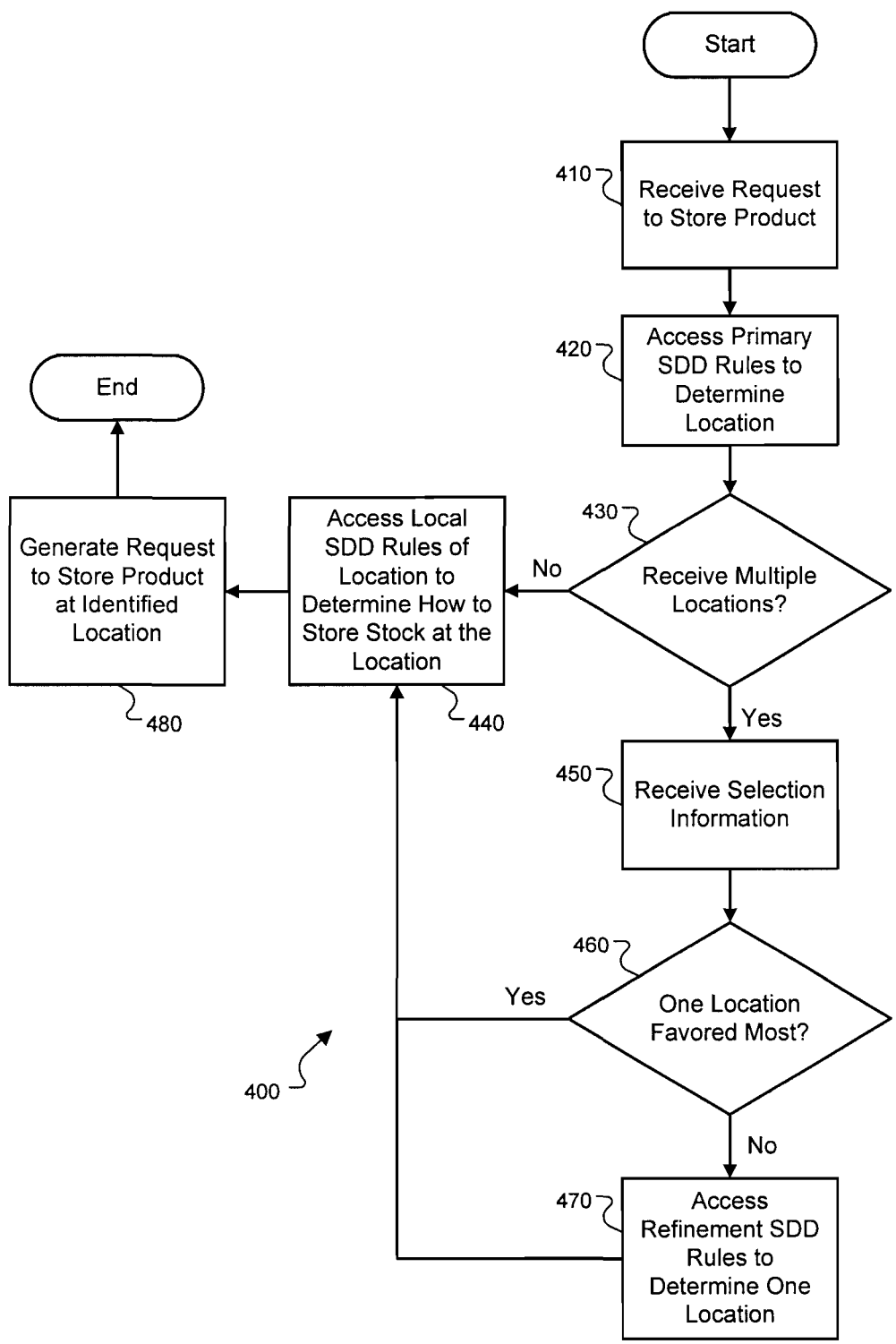
FIG. 4 is an exemplary method for selecting a location to place or retrieve stock according to one implementation.

FIG. 4 is an exemplary method 400 for selecting a location to place or retrieve stock according to one implementation. When a request to place or remove stock from a location is created, the system 100 shown in FIG. 3 may implement the method to determine where and how to place or retrieve the stock. For example, incoming stock may be received at an unloading area in a warehouse. A request to store the received stock may be generated and a source and destination determination (SDD) engine can execute the method 400 to identify a location to store the stock.

In step 410, the request to store an incoming product can be received. For example, the SDD engine (not shown in the FIGs) may receive the requests to store the incoming stock. In step 420, primary SDD rules are accessed to determine possible locations to store the incoming product. The SDD engine can access the primary SDD rules and used them to determine one or more locations that are suitable for storing incoming product. For example, the SDD rules may query SLDOs to determine what stock is associated with the location that the SLDO represents. The SDD rules may filter out all the locations that do not store the same type of stock that was just received, and return an identifier specifying the locations that have the same type of stock.

Step 430 is performed to determine if multiple locations are returned as a result of executing the rules accessed in step. For example, application of the SDD rules may return more than one location that is appropriate for storing the incoming stock. If only a single location is returned, step 440 is performed, where the local SDD rules are accessed to determine how to store stock at the single location returned in the step 420. The step 440 is described in more detail below.

If multiple locations are returned, selection information can be received, as indicated in step 450. For example, the query to determine a location to place the incoming stock is the event information 108. The rule 116 may use the query to determine that if the stock is delivered to the location, a replenishment action will not be necessary for that location. This determination may initiate generation of an action request 124 with selection information 332. The SDD engine may receive and use the selection information to select the location that is "starved" for stock over other locations. In other words, if a location is needs stock, it may be selected over other locations that have enough stock.

Next, step 460 can be performed, which determines whether one returned location is favored above other returned locations. For example, the SDD engine may receive selection information 332 from one or more locations. If only one location returns information 332, step 440 is performed. Even if more than one location returns selection information, one location still may be favored over other locations. For example, one location may be more "starved" for stock than another location which also needs stock. The amount of stock needed may be transmitted with the selection information 332, and the amount can be used to determine whether one location is favored more than another. If one location is more favored, step 440 may be performed. If multiple locations are favored similarly, step 470 may be performed.

In the step 470, refinement SDD rules are accessed to filter the locations until one location is selected. The SDD engine may contain refinement SDD rules that prioritize locations based on a set of criteria. For example, the refinement rules may select the location that is closest to the unloading area where the incoming stock is currently stored. After one location is determined, step 440 can be performed.

In the step 440, the local SDD rules are accessed. For example, the local SDD rules 330 may be associated with the SBM 304. When the location is determined, the SBM associated with that location is accessed and the local SDD rules 330 are retrieved. The local SDD rules can specify additional requirements for storing the stock at the location. For example, the local SDD rules may indicate that if the stock weighs over a certain amount, it must be divided into portions less than that amount and stored in different locations.

In step 480, a request is generated to store the product at the single returned location. For example, an identifier specifying the location along with any requirements indicated by the local SDD rules may be returned to the SDD engine in the form of a request to store the product at the identified location.

Figure 5:
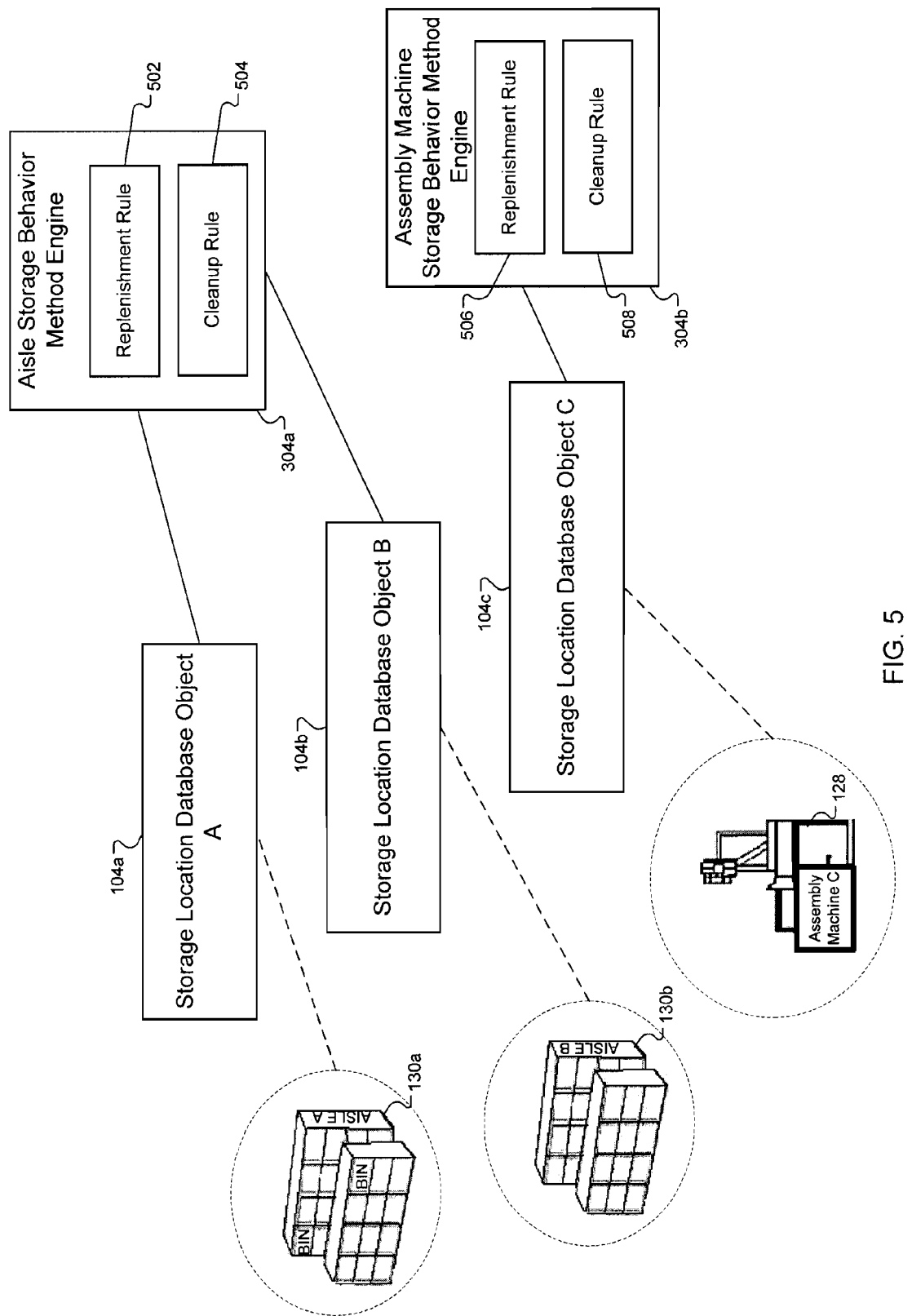
FIG. 5 is an exemplary schematic diagram of rules linked to multiple logistic area data base objects of different types.

FIG. 5 is an exemplary schematic diagram of rules linked to multiple logistic area data base objects of different types. The FIG. 5 includes three SLDOs 104a, 104b, and 104c. The SLDOs 104a and 104b are linked, or associated, with one SBM that defines replenishment rules 502 and clean-up rules 504 for aisles. The SLDO 104c is linked to another SBM that defines replenishment rules 506 and clean-up rules 508 for assembly machines, such as the assembly machine 128.

Use of separate SBMs for each type of location enables the rules associated with the SBMs to be specific for one type of location. For example, the replenishment rules 506 for the assembly machine 128 can differ from the replenishment rules 502 for the aisles. More specifically, replenishment rule 502 associated with the aisle may determine that the aisle does not have enough stock to fulfill an order. The rule 502 may initiate an action that requests more stock be delivered to the aisle. A replenishment rule 506 associated with the assembly machine may determine that the assembly machine needs more unassembled stock to complete an order for unassembled stock. A request may be generated to move unassembled stock from a warehouse bin to the assembly machine so that the assembly machine may assemble the stock and complete the order.

Additionally, using one SBM for multiple locations that share similar characteristics can simplify maintenance of the rules of the SBM. For example, if a user desires to modify the clean-up rule 504 for aisles, the user only has to modify the clean-up rule 504 which is stored in the SBM 304a. In contrast, if different clean-up rules were associated with each SLDO 104, a user would have to modify each different clean-up rule to affect a change for all aisle storage locations.

FIG. 5 also illustrates that the SLDOs can represent several types of storage locations. For example, SLDOs 104a and 104b represent aisles, while SLDO 104c represents production machinery. Additionally, the SLDOs can represent storage locations at different hierarchical levels. For example, a SLDO may represent a storage area at a lower level, such as a bin, or a storage area at a higher level, such as an aisle. The higher level storage locations may logically include the storage locations at lower levels. For example, the aisle 130 may include several bins.

Figure 6:
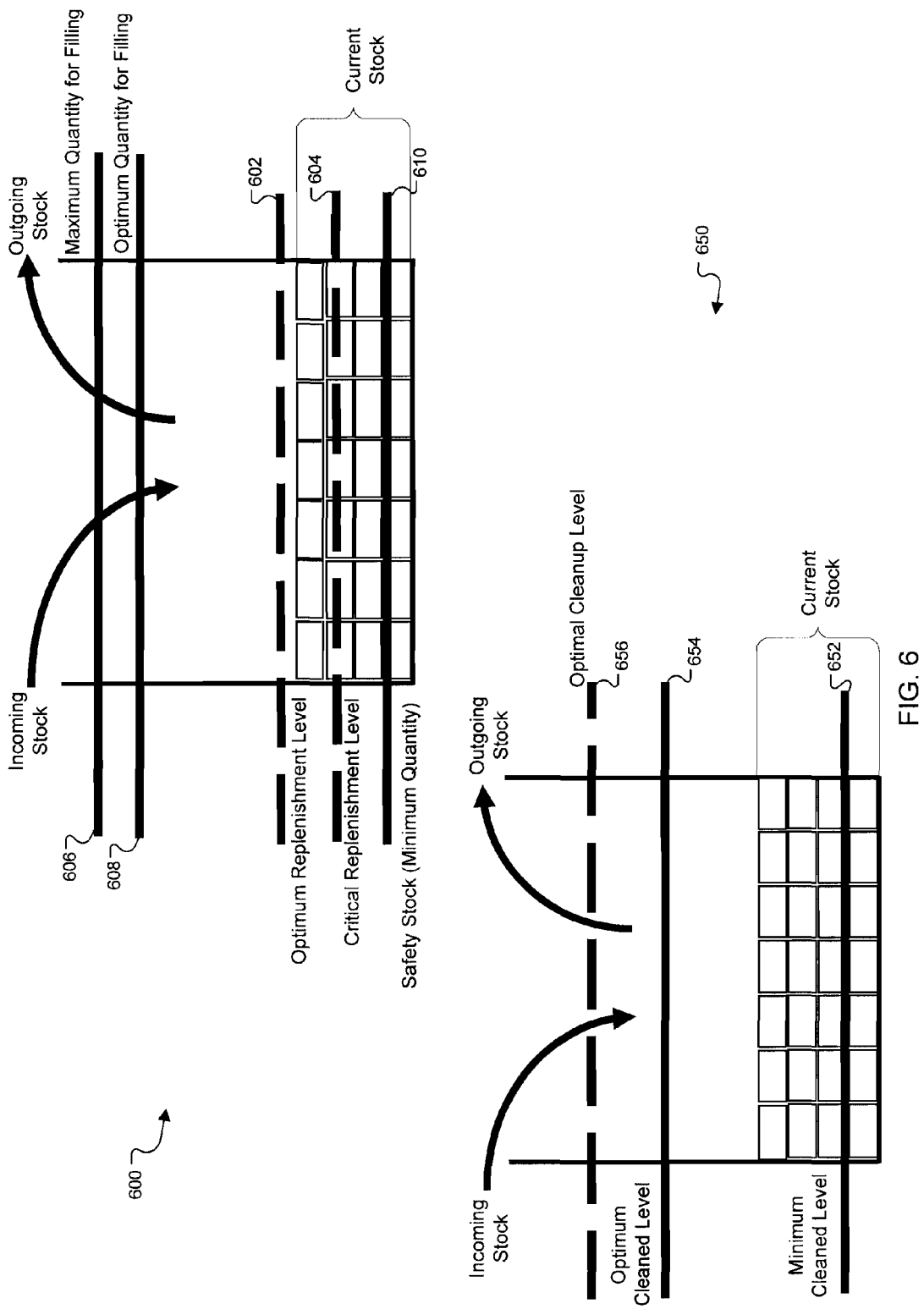
FIG. 6 is a schematic diagram of the clean-up and replenishment operations according to one implementation.

FIG. 6 is a schematic diagram of clean-up and replenishment operations according to one implementation. The illustrated replenishment operation may include generating a request for more stock if replenishment conditions are satisfied (e.g., when the location does not have enough stock as defined by the thresholds). The illustrated clean-up operation may include generating request to remove stock if clean-up conditions are satisfied (e.g., when the location has too much stock as defined by the thresholds). The FIG. 6 shows the thresholds used to determine whether the replenishment or clean-up operations are triggered.

More specifically, a storage location bin 600 shows replenishment thresholds and filling thresholds. The replenishment thresholds shown are an optimal replenishment level 602 and a critical replenishment level 604. The filling thresholds shown are the maximum quantity for filling threshold 606 and an optimum quantity for filling threshold 608. When the level of stock drops below the optimal replenishment level 602, the storage control object associated with that location can generate a request to deliver more stock to the location. If the level of stock drops below the critical replenishment level 604, the storage control object may generate a request with a high priority to deliver more stock to the location. The high priority request may be completed before other requests, such as the requests generated when stock drops below critical replenishment levels.

The stock that is physically available in the bin 600 is indicated by a bracket labeled "Current Stock." When the requests for more stock are generated, the requests can take into account the current level of stock and the filling thresholds. For example, the amount of requested stock may be an amount which added to the current level of stock equals the amount specified by the optimum quantity for filling thresholds 608. In another example, the warehouse may have excess stock that needs to be stored so the request may specify that a stock amount be requested that fills the bin to the maximum quantity for filling thresholds 606. The filling thresholds can prevent overfilling the location with too much stock.

Additionally, a safety stock threshold 610 can represent an amount of stock that the system is required to leave in the bin for certain situations, such as emergencies.

A storage location bin 650 shows clean-up thresholds, such as a minimum cleaned level 652, an optimum cleaned level 654, and an optimal cleanup level 656. In one implementation, when stock exceeds an optimal cleanup level 656, an order may be generated to remove excess stock until the amount of stock in the bin 650 is below or at an optimum cleaned level 654. If more stock is needed at a different location, a request may be generated so that stock is removed from the location until the amount of stock meets the minimum cleaned level 652. In another implementation, if the stock falls below the minimum cleaned level 652, all of the stock may be removed from the bin 650. Additionally, the amount of stock to be removed may be specified by a user. For example, a warehouse worker may request that clean-up be performed on a location and specify an amount of stock to remove from the location.

In other embodiments, the amount of stock removed from the location may be specified in the received event information. For example, if the information included in the event specifies that 50 units of stock will be placed in bin A, then 50 units of stock currently in bin A may be removed to make room for the incoming stock. The amount of stock removed may also be dictated by a capacity of the location. For example, the storage control object may include a capacity property for the associated location. The received event may include information that 100 units of stock are to be placed in bin A, however, bin A has a capacity of 150 units and already has 110 units of stock. The rule 116 may use the capacity, current amount, and incoming amount to determine how much stock needs to be removed for the location to remain at or below capacity. In one implementation, the method may add the incoming stock amount to the current stock amount and subtract the capacity to determine the necessary amount of stock to remove (i.e., Incoming+Current−Capacity=Remove). Using the amounts given in the example, the calculation is 100+110−150=60 units for removal.

Figure 7:
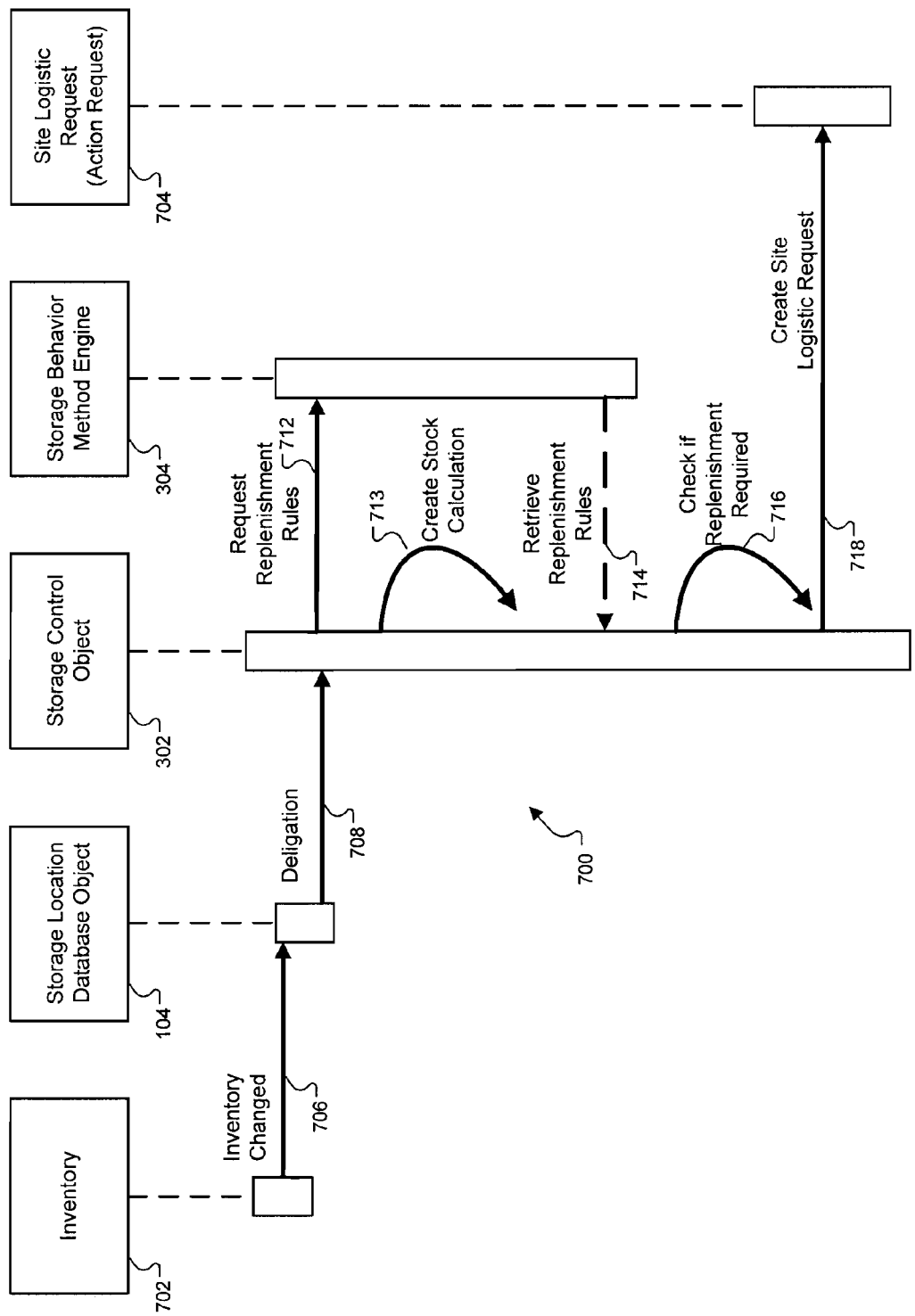
FIG. 7 is a sequence diagram for the replenishment operation according to one implementation.

FIG. 7 is a sequence diagram 700 for the replenishment operation according to one implementation. The clean-up operation could be described with a similar sequence diagram, where the replenishment retrieval and check of replenishment rules is replaced with a retrieval and check of clean-up rules.

The exemplary sequence diagram 700 illustrates actions of five objects: an inventory object 702, the SLDO 104, the storage control object 302, the SBM 304, and a site logistic request object 704. The sequence can be initiated by the inventory object 702, which transmits information indicating that inventory, for example in a warehouse, has changed, as indicated by an arrow 706. The information can be directed to a specific SLDO using a method similar to the method 400 shown in FIG. 4.

The SLDO 104 can, in turn, delegate the information to the storage control object 302 that is dependent upon the SLDO, as indicated by an arrow 708. The storage control object may then perform several actions.

The storage control 302 can transmit to the SBM 304 a request for the replenishment rules, as indicated by an arrow 712. In one implementation, the SBM may select all the replenishment rules to return, or it may select a subset of the replenishment rules to return. The retrieval request 712 may specify a particular replenishment rule to retrieve based on the inventory information received from the SLDO. For example, the inventory information may indicate that a particular type of stock is being requested. Thus, the storage control object may specify in the request that the SBM only return replenishment rules related to the certain type of stock be returned by the SBM.

As indicated by an arrow 713, the storage control can create a stock calculation, which may determine the amount of stock currently in the storage location as well as the expected stock amount for the storage location at a future time. For example, the storage control object may access a property that indicates the current amount of stock stored at the storage location. In addition, the storage control object can transmit queries to other objects not shown, such as request and order objects, where the queries request information about expected incoming or outgoing stock for the storage location.

After the SBM selects the rule or rules to return, the SBM can transmit the rule as indicated by an arrow 714. In another implementation, each specific product has a single replenishment rule associated with it. In this case, the SBM returns the single rule in response to the retrieval request 712.

As an arrow 716 shows, the storage control object 304 can then determine if replenishment is required. For example, the storage control object 302 may access the thresholds, retrieve the relevant rules, and calculate the amount of stock associated with the location. In one implementation, the storage control object 302 may call a separate service that retrieves the stock currently associated with the location. For example, the service may be an availability service that retrieves the amount of stock that will be delivered to the location, the stock that is currently stored at the location, and the stock that will be removed from the location. The storage control object may retrieve this information from other objects, such as an inventory object, which is described in greater detail in association with FIG. 8. Next, the storage control object 302 may use the retrieved rules to determine if the stock associated with the location crosses the threshold. If the threshold is crossed, the condition specified by the rules may be satisfied and an action specified by the rule may be executed.

If replenishment is required, then the storage control object creates a site logistic request and transmits it to the site logistic request object, as shown by an arrow 718. The site logistic request may include requests for actions that bring the stock at the location above the replenishment thresholds, such as a request for more stock to be delivered to the location. Additionally, the created site logistic request may have an associated quantity that specifies how much stock to retrieve for replenishment and a priority that indicates an order in which the system should perform the request relative to other requests. The priority and the quantity can be specified by a user or predetermined by information stored in the rules.

Figure 8:
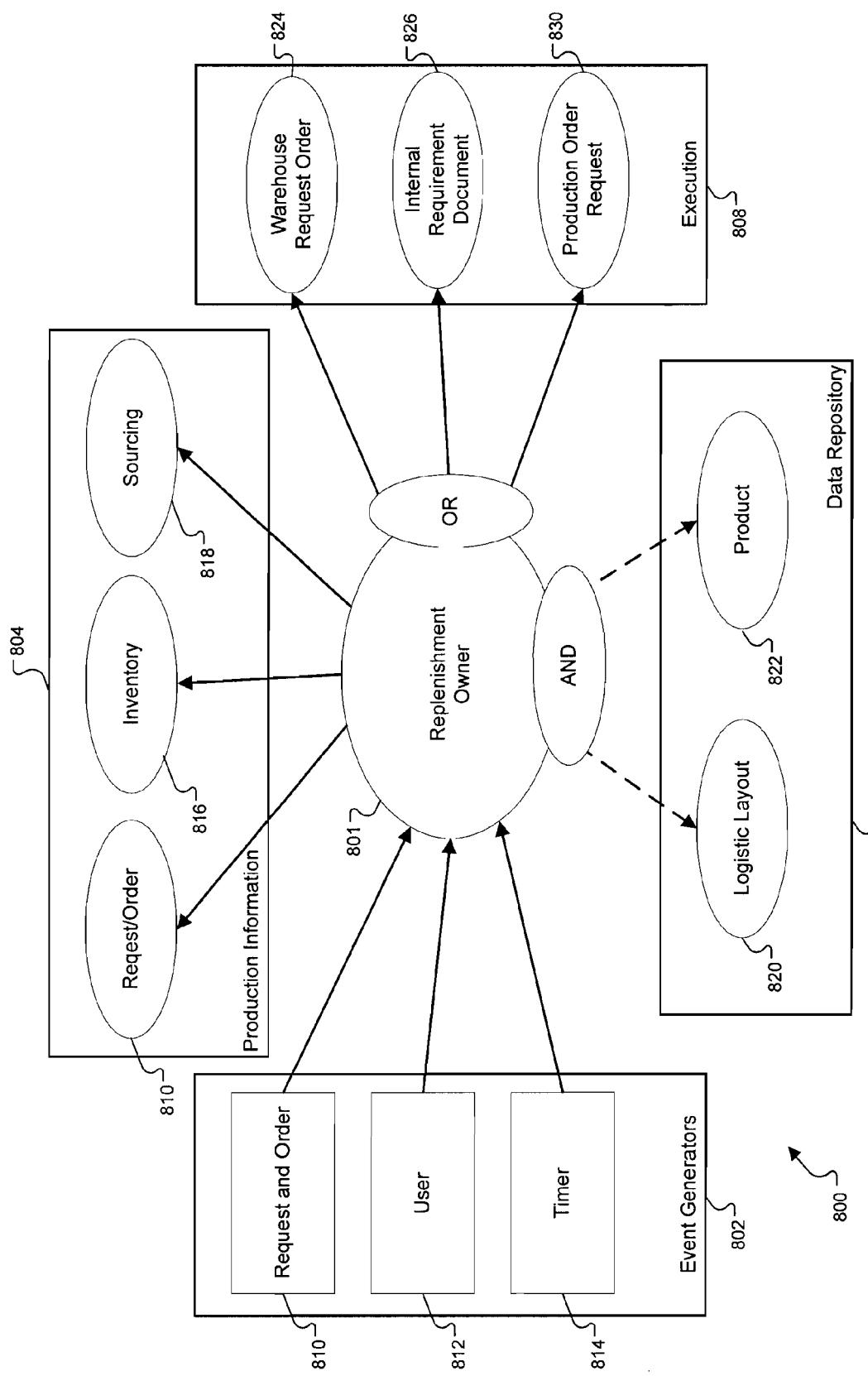
FIG. 8 is a block diagram of a system for replenishing a storage location with stock according to one implementation.

FIG. 8 is a block diagram of a system 800 for replenishing a storage location with stock according to one implementation. The FIG. 8 shows a more detailed view of the objects that interact with a replenishment owner 801. In one implementation, the storage control object can be the replenishment owner. The objects in the diagram include event generator objects 802, production information objects 804, data repository objects 806, and execution objects 808.

The event generator objects 802 can include request and order objects 810, a user object 812, and timer objects 814. The request object can trigger replenishment when a picking or consumption location is specified in the request, and the order object can trigger replenishment when the replenishment is required in advance (e.g., before confirmation of the order). The user object 812 may transmit a request initiated by a user that triggers replenishment when the user recognizes a need for more stock at the location. The user may either explicitly specify a quantity of stock and a priority of the request or ask the system to calculate it. The timer objects 814 can trigger replenishment periodically.

In one implementation, the replenishment owner 801 can access the request and order objects 810 (which may be the same objects that generate the events), an inventory object 816, and a sourcing object 818 to determine production information. For example, the replenishment owner 801 can query the inventory object to obtain data on current stock at a resource, such as production machinery, and receive information related to expected stock for the machinery from the order and request objects. The replenishment owner 801 can query the sourcing object 818 to verify that the required stock for replenishment is located locally. If the stock is not local, the replenishment owner 801 may create a request to obtain the stock from another part of the logistic environment. For example, the owner 801 can create a request to move stock from a distribution area of a warehouse to a production area of the warehouse.

In another implementation, the replenishment owner 801 determines warehouse information. This can be accomplished in a similar manner to the above describe determination of production information, but the replenishment and clean-up methods can be used to control storage of stock in locations, such as warehouse aisles and bins.

The replenishment owner 801 may also access a logistic layout object 820 and a product object 822 in the data repository. The replenishment owner can use the combination of the information from the logistic layout object in the product object to determine a location from which to retrieve the specified stock. In other implementations, another object, such as a source destination determination object (SDD), is used to determine the location from which to receive the stock. This is described in greater detail below.

If replenishment is necessary, the replenishment owner may initiate a request for execution objects 808. The execution objects can include warehouse request and order objects 824, which request stock to be moved to a location, and production order requests 830, which initiates a request to produce stock for inventory. The execution objects can also include internal requirement documents 826, which can be generated by the replenishment owner if the stock is not available locally, but instead needs to be requested from an external source. The documents 826 may specify the external source, the stock required, the destination for the stock, and the delivery date.

Figure 9:
FIG. 9 is a screen shot of an exemplary graphical user interface for a system that performs replenishment operations.

FIG. 9 is a screen shot of an exemplary graphical user interface (GUI) 900 for a system that performs operations, such as replenishment operations. The GUI can be displayed on the administration computing device 306 of FIG. 3, and accessed by the user to modify thresholds and storage behavior methods for a particular location or a group of locations. Additionally, although not shown, the modifications may specify a particular product that is affected by the thresholds and methods.

The GUI can include a "Choose operation state" input area 902, a "Choose analysis method" input area 904, a "Choose threshold" input area 906, a "Choose operational mode" input area 908, and a "Choose quantity strategy" input area 910.

The "Choose operational state" input area 902 can include options that specify what replenishment rules, or other rules, the system should apply. For example, if a user selects "critical replenishment" 912, the system will use the critical replenish threshold, which defines a critical stock level when the replenishment is performed. The amount of stock at the location may be derived from the inventory, order, and request objects. Similarly, if the user selects "optimal replenishment" 914, the system will use the optimal replenishment threshold which defines an optimal stock level when the replenishment is performed.

The "Choose analysis method" input area 904 can specify a particular analysis method when more than one condition can realize a certain state. For example, the user may select a "current horizon" option 916 to protect the current stock level at the location by balancing current and incoming stock. The user may select an "expected horizon" option 918 to protect the current stock level by balancing currently expected stock. Additionally, the user may select a "supply & demand network" option 922 to protect the expected stock level by balancing supply and demand over time using past supply and demand information.

The user can input the replenishment, or other thresholds, in the "Choose threshold" input area 906. This threshold can correspond to the operational state selected from the input area 902. For example, if the critical replenishment operational state is selected, the threshold 25 may define the point at which critical replenishment is triggered. If the GUI 900 modified another method besides replenishment, such as clean-up or counting operations, the threshold and other selection would affect the specified method.

The "Choose quantity strategy" input area 910 can specify how much stock to retrieve for storage when replenishment is triggered. For example, the user may select a "capacity based" option 922 and the system can request stock based on how much the location can hold. If the user selects a "by order" option 924, the system can request stock based on the quantity of stock set by the order. For example, if the replenishment is triggered because a location receives an order to retrieve 50 units of stock, the replenishment order may request 50 units of stock.

The "Choose operation mode" input area 908 can specify a time at which the other fields are to apply. For example, the user may select an option "day" 926, and the may apply the selected operational state, analysis method, threshold, and quantity strategy specified during the hours from 12 a.m. to 11:59 a.m. If the user selects an option "night" 928, the specified criteria can be applied during the hours from 12 p.m. to 11:59 p.m. Different criteria may be selected and saved for each time period. For example, a user may enter different selections in the choose threshold area 906 for the day operation mode relative to the selections entered for the night operation mode. In other implementations, the operation mode may define different work modes for the site, for example "rush hour" or "end of shift," which may or may not correspond to the same time every day.

Figure 10:
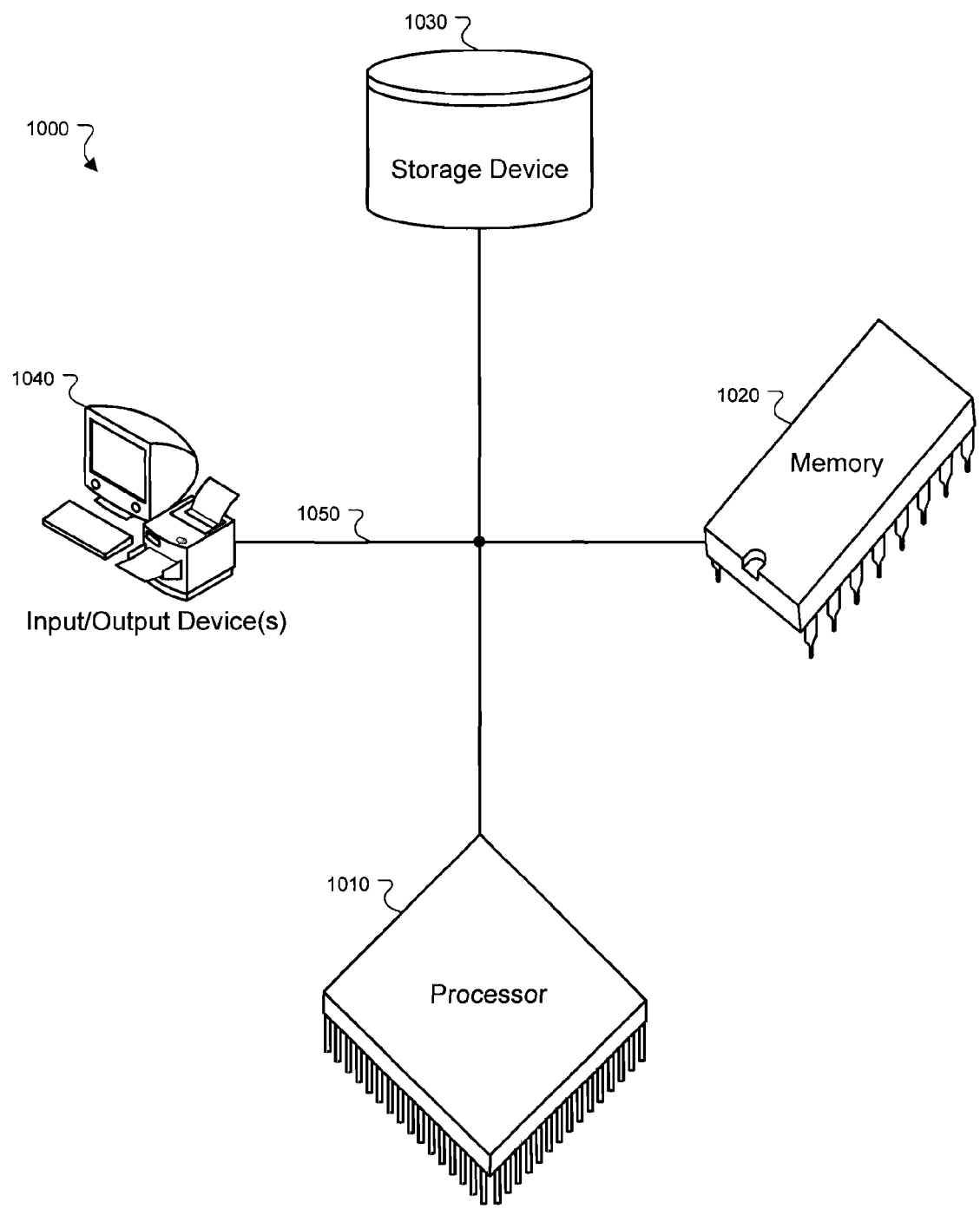
FIG. 10 is a schematic diagram of a general computing system.

FIG. 10 is a schematic diagram of a generic computer system 1000. The system 1000 can be used in the methods 200, 400 and the sequences in FIGS. 7 and 9, which are described above, according to one implementation. For example, the system 1000 may be included in either or both of the administrative computing device 306 and the other computing devices that execute the software platform that includes the system 100.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface, such as the GUI 900, on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 100. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces, such as the GUI 900.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of the described embodiments. For example, the steps of the flow and sequence diagrams can be performed in a different order, such as the stock calculations 713 of FIG. 7 can be performed after the replenishment rules are retrieved as indicated by the arrows 712, 714. In another example, a user can enter information into the GUI 900 using voice commands instead of selecting options with a keyboard or mouse. Also, many of the examples in the application are described in the context of a warehouse; however a logistic environment may include production facilities, supermarkets, and any environment where stock is held in a storage location. In addition, the primary or refinement SDD rules may include filtering locations for product storage based on other requirements, such as size requirements, storage requirements (e.g., cold storage), and weight requirements (e.g., No high rack).

Also, in some implementations, the rules in the SBM can be used for other locations, such as trucks. For example, the rules may direct the planning and execution of movement to and from trucks in a transportation system. Additionally, human workers can be considered locations. For example, a "replenishment" request may be generated for a worker that is moving boxes onto a truck. The system can use the replenishment request to supply the worker with a steady stream of stock to load onto the truck.

In yet other implementation, the SLDO represents a location that is a container for holding stock. For example, the SLDO can be a palate, box, or oil tank. If an action, such as a clean-up request, is issued for that location, the contents of the container, such as the stock on the pallet, the stock in the box, or the oil in the oil tank, can be removed from the container.

In some implementations, the requirements for each of the storage locations may be based on a global maximizing function, which determines stock levels for all the locations. The maximizing function may be decomposed into separate constraints, each of which is applicable to a particular storage location. The SLDOs associated with the locations may implement the constraints as the above described requirements.

Additionally, the requirements, or thresholds, can be modified by the system based on the current date or time. For example, the optimal clean-up threshold may be different during the hours from 9 am to 5 pm relative to the hours from 5:01 pm to 8:59 am. This may give a user flexibility to input thresholds for different time and date periods based on historical data describing different stock flow at a location during different times. Similarly, other information, such as the priority assigned to a request, may be varied based on the time period.

In another implementation, the event generator may transmit event information based on a request for an inventory report. For example, a user may request an inventory report for a particular location. The event information generated from that request may trigger an action at the location, such as replenishment, clean-up, and an inventory count of the location. Accordingly, other embodiments are within the scope of the following claims.

What is claimed is:

1. A non transitory computer readable medium, the computer program product including instructions that, when executed by a computer system, cause the computer system to perform operations that modify stock levels of a storage location in a logistic environment system, the operations comprising:

instantiating, by the computer system, a storage location database object;

receiving, at the storage location database object that is running on the computer system, information indicating a future change at one or more future times in a level of physical stock at a physical storage location in a logistic environment, wherein the storage location database object is one of a plurality of storage location database objects that represent a plurality of different physical storage locations in the logistic environment, wherein the storage location database object has associated with it a rule, a stock amount value specifying an amount of physical stock for the storage location, and a threshold that indicates a level of physical stock to be maintained for the physical storage location, and wherein the stock amount value is based upon a current amount of physical stock at the storage location and future scheduled changes to the level of physical stock at the physical storage location;

determining, by the storage location database object using the rule, that the future change in the level of physical stock will cause the stock amount value to cross the threshold at the one or more future times, wherein the storage location database object manages the level of physical stock only at the physical storage location and other storage location database objects from the plurality of storage location database objects manage levels of physical stock at other physical storage locations from the plurality of different physical storage locations in the logistic environment; and in response;

generating, by the storage location database object, a request to modify the amount of physical stock at the physical storage location so that the stock amount value does not cross the threshold at the one or more future times, wherein the generated request is provided by the storage location database object to a centralized execution object that is configured to execute the request generated by the storage location database object and requests generated by the other storage location database objects.

2. The computer program product of claim 1, wherein the rule is associated with multiple storage location database objects.

3. The computer program product of claim 1, wherein the physical storage location represented by the storage location database object is one of multiple levels of a hierarchy of physical storage locations.

4. The computer program product of claim 1, wherein the future change in the level of physical stock is based on expected changes in the level of physical stock at the one or more future times.

5. The computer program product of claim 1, wherein the operations further comprise determining if the future change in the level of physical stock will cause the stock amount value to cross a second threshold at the one or more future times, wherein the second threshold is associated with the storage location database object and indicates a second stock level to be maintained for the physical storage location.

6. The computer program product of claim 5, wherein the operations further comprise generating a second request to remove or add physical stock to the physical storage location so that the stock amount value does not cross the second threshold at the one or more future times.

7. The computer program product of claim 1, wherein the operations further comprise assigning to the request a priority that indicates a status of urgency to complete the request relative to other requests.

8. The computer program product of claim 1, wherein the level of physical stock indicated by the threshold is a replenishment level that indicates a level of physical stock at which the physical storage location should receive more physical stock.

9. The computer program product of claim 8, wherein the operations further comprise associating with the generated request a stock identifier that specifies the physical stock to be received at the physical storage location.

10. The computer program product of claim 1, wherein the level of physical stock indicated by the threshold is a cleanup level that indicates a level of physical stock at which physical stock should be removed from the physical storage location.

11. The computer program product of claim 1, wherein the storage location database object represents a physical storage location that is a resource that manipulates physical stock.

12. The computer program product of claim 11, wherein the resource is a vehicle for moving the physical stock.

13. The computer program product of claim 11, wherein the resource is a human worker for moving the physical stock.

14. The computer program product of claim 11, wherein the resource is production machinery that executes operations on physical stock.

15. The computer program product of claim 1, wherein the storage location database object represents a physical storage location that is a container for holding physical stock.

16. The computer program product of claim 1, wherein the threshold is based on constraints decomposed from a global maximizing function that takes into account the requirements of multiple physical storage locations in the logistic environment.

17. The computer program product of claim 1, wherein the information indicating the future change in the level of physical stock is selected from a group consisting of an incoming stock request, an outgoing stock request, a user-initiated replenishment request, a user-initiated clean-up request, a timer event indicating a predetermined amount of time will have passed at the one or more future times, and a request to run a report.

18. The computer program product of claim 1, wherein the operations further comprising receiving a user assigned value for the threshold.

19. A logistic environment system for maintaining stock levels by an object representing a storage location, comprising:
   one or more processors;
   a computer-readable storage medium tangibly embodied in a storage device for storing a set of instructions that, when executed by the one or more processors, cause the one or more processors to instantiate and run:
      a storage location database object that represents a physical storage location for physical stock in a logistic environment, wherein the storage location database object is adapted to receive information indicating a future change at one or more future times in a level of physical stock at the physical storage location in the logistic environment, wherein the storage location database object is one of a plurality of storage location database objects that represent a plurality of different physical storage locations in the logistic environment, and wherein the storage location database object manages the level of physical stock only at the physical storage location and other storage location database objects from the plurality of storage location database objects manage levels of physical stock at other physical storage locations from the plurality of different physical storage locations in the logistic environment;
   wherein the storage location database object is further adapted to access and use the following:
      a stock amount value associated with the storage location database object, wherein the stock amount value specifies an amount of physical stock for the physical storage location and wherein the stock amount value is based upon a current amount of physical stock at the physical storage location and future scheduled changes to the level of physical stock at the physical storage location;
      a threshold associated with the storage location database object, wherein the threshold indicates a level of physical stock to be maintained for the physical storage location; and
      a rule associated with the storage location database object that the storage location database object uses i) to determine that the future change in the level of physical stock will cause the stock amount value to cross the threshold at the one or more future times and, in response, ii) to generate a request to remove or add physical stock to the physical storage location so that the stock amount value does not cross the threshold at the one or more future times, wherein the generated request is provided by the storage location database object to a centralized execution object that is configured to execute the request generated by the storage location database object and requests generated by the other storage location database objects.

20. A method for modifying stock levels of a storage location in a logistic environment system, comprising:
   receiving, at a storage location database object that is running on a computer device, information indicating a future change at one or more future times in a level of physical stock change at physical a storage location in a logistic environment, wherein the storage location database object is one of a plurality of storage location database objects that represent a plurality of different physical storage locations in the logistic environment, wherein a storage location database object has associated with it a rule, a stock amount value specifying an amount of physical stock for the storage location, and a threshold that indicates a level of physical stock to be maintained for the physical storage location, and wherein the stock amount value is based upon a current amount of stock at the storage location and future scheduled changes to the level of physical stock at the physical storage location;
   determining, by the storage location database object on the computer device using the rule, that the future change in the level of physical stock will cause the stock amount value to cross the threshold at the one or more future times, wherein the storage location database object manages the level of physical stock only at the physical storage location and other storage location database objects from the plurality of storage location database objects manage levels of physical stock at other physical storage locations from the plurality of different physical storage locations in the logistic environment; and in response;
   generating, by the storage location database object on the computer device, a request to modify the amount of physical stock at the physical storage location so that the stock amount value does not cross the threshold at the one or more future times, wherein the generated request is provided by the storage location database object to a centralized execution object that is configured to execute the request generated by the storage location database object and requests generated by the other storage location database objects.

* * * * *